United States Patent [19]

Hornbaker et al.

[11] 3,715,923
[45] Feb. 13, 1973

[54] TEMPERATURE MEASURING METHOD AND APPARATUS

[76] Inventors: David R. Hornbaker, 1520 Cole Way, La Habra; Dieter L. Rall, 11818 E. North Circle Dr., Whittier, both of Calif.

[22] Filed: July 23, 1970

[21] Appl. No.: 57,629

[52] U.S. Cl. ....................73/361, 73/359, 73/362.8
[51] Int. Cl. ..........................G01k 1/16, G01k 7/12
[58] Field of Search..................73/359, 361, 362.8

[56] References Cited

UNITED STATES PATENTS

| | | | |
|---|---|---|---|
| 3,267,726 | 8/1966 | Sellers | 73/341 X |
| 3,332,285 | 7/1967 | Cook | 73/359 |
| 3,525,260 | 8/1970 | Kung | 73/361 X |
| 3,430,492 | 3/1969 | Matsumoto et al. | 73/361 |
| 2,991,654 | 7/1961 | Engelhard | 73/359 |
| 3,295,842 | 1/1967 | Stelling et al. | 73/351 X |
| 3,427,882 | 2/1969 | Wagner | 73/351 |

Primary Examiner—Louis R. Prince
Assistant Examiner—Frederick Shoon
Attorney—Fulwider, Patton, Rieber, Lee & Utecht

[57] ABSTRACT

A temperature measuring method and apparatus, the apparatus including a thermal sink or reference body signal a heat flow sensor, and operative to determine the temperature of an external medium or body by utilizing the principle that convective and conductive heat exchange between the reference body and the external body will be zero when the bodies are at the same temperature, the apparatus in one embodiment having the heat flow sensor mounted in a reference body whose temperature is known. The method of the invention yields the absolute temperature of the external body by using the heat flow sensor to sense the rate of convective heat flow between the bodies, and then calibrating the resulting signal or output in terms of the temperature difference between the bodies. In one embodiment of the apparatus the external body is carried through or across the reference body a predetermined distance from the heat sensor to facilitate calibration of the heat flow sensor output signal.

14 Claims, 3 Drawing Figures

PATENTED FEB 13 1973

3,715,923

INVENTORS.
DAVID R. HORNBAKER
DIETER L. RALL
BY Fulwider, Patton, Rieber,
Lee and Utecht
ATTORNEYS

TEMPERATURE MEASURING METHOD AND APPARATUS

CROSS REFERENCE TO RELATED APPLICATION

The present method and apparatus is related to our U.S. Letters Pat. No. 3,542,123, issued Nov. 24, 1970, and entitled "Temperature Measurement Apparatus." The subject matter of the present application includes the additional concept or method of calibrating the heat flow sensor signal in terms of the temperature difference between the reference body and the external body whose temperature is of interest. Such calibration of the heat flow sensor signal can only be accomplished when important variables which affect the signal, such as the spacing between the reference and external bodies, are kept substantially constant. Our U.S. Pat. No. 3,542,123 was not restricted to this calibration concept or method. In addition, the present application discloses an apparatus for maintaining the external body, a fiber in the preferred embodiment, a predetermined distance from the reference body to facilitate calibration of the heat flow sensor output signal.

BACKGROUND OF THE INVENTION

1. Field of the Invention

The present invention relates to a temperature measuring method and apparatus for measuring the temperature of an eternal medium or proximate body, and particularly a moving external body.

2. Description of the Prior Art

The temperature of stationary objects is generally now measured by a variety of methods and apparatus, such as by attachment of a thermocouple, resistance thermometer, or like device directly to the object. Although this is satisfactory for most applications, it is usually not capable of both fast response to temperature change and also resistance to the abuse of practical use in a production facility. More particularly, where the apparatus is sufficiently rugged for production use in process control, for example, the consequent relatively large mass of the apparatus takes time to change temperature in response to any deviation of the measured body from the desired or "set point" temperature. Conversely, when the mass of the apparatus is reduced to improve its sensitivity, the apparatus usually lacks the ruggedness required in shop use. The apparatus of the prior art intended to solve this problem is consequently undesirably expensive and difficult to operate.

The foregoing problems are further compounded when it is necessary to detect the temperature of an object or external body without being able to physically contact the body, such as in the detection of in-process temperatures of moving strip material. This situation is encountered, for example, in thermal forming and processing of plastics, tape, thin sheet, wires, fibers, and the like; in paper manufacturing, coating, and finishing; in adhesive application and curing, and in ink and paint drying, and the like. The surfaces of the body or material whose temperature is of interest are generally either flat, such as moving sheet material, or rounded, such as rotating rolls of processing equipment.

In most prior art so-called "non-contact" methods of detecting the temperature of a body, reliance was made upon the relationship between the absolute temperature of the body and the amount of energy it was radiating. Such devices develop a signal proportional to the temperature of the body and its surface emissivity, and are usually sensitive to radiation only over a relatively narrow spectral band width. Consequently, any changes in spectral emissivity affects the accuracy of the apparatus, such as the changes in color of the paper sheet in multi-color printing. Moreover, such radiation sensitive apparatus is not suited to determination of the temperature of a transparent body being heated by radiant heating devices located oppositely of the apparatus.

In our U.S. Pat. No. 3,542,123 we disclosed temperature detection apparatus which included a thermal sink or reference body mounting a heat flow sensor, and operative to determine the temperature of an external medium or body according to the principle that net heat exchange between the reference body and the external body will be zero when the bodies are at the same temperature. The apparatus was particularly adapted for non-contact detection of the temperature of moving bodies, whether the bodies be characterized by a flat surface or a curved surface such as in cylindrical rolls or drums, for example.

In our prior apparatus the heat flow sensor is mounted in a sensing head having an operative surface adapted for placement in close proximity to the external body whose temperature is to be detected. The sensor is generally flush with the operative surface and recalibrations of the apparatus for different orientations of the sensing head are unnecessary.

The temperature of the sensing head in our prior apparatus is indicated by a temperature sensor associated with the head, and the head temperature is adjustable by heating and cooling means also associated with the head. Thus, an absence of heat flow between the head and the external body allows determination of the temperature of the external body by reading the temperature sensor output. Where it is desired to use the apparatus to adjust the temperature of the head, the heat sensor output is coupled to any usual null point process controller for this purpose.

Whether used for temperature monitoring or for control purposes, the proximity between the surfaces of the external body and the heat sensor renders the heat sensor quickly reactive to convective heat exchange.

The apparatus of the present invention is substantially identical in operation and construction to our previous apparatus described in our U.S. Pat. No. 3,542,123. However, the present apparatus is particularly adapted for calibration of the heat flow sensor output signal to yield the absolute temperature of the external body, and it is particularly adapted for measuring or controlling the temperature of multiple fiber yarn or monofilament materials such as fish line or wire while the material is moving. No successful methods or apparatus have been available in the past to make such measurements, although various devices have been tried. These have included such instruments as infrared thermometers and contacting thermocouples and resistance thermometers. All of these devices fail to work successfully for various reasons. The infrared devices cannot focus successfully on areas smaller than about 0.10 inch diameter and hence cannot measure yarn and monofilament materials which are as small, in many cases, as 0.010 inch in diameter. The infrared devices can also be affected by environmental factors such as vapors present in industrial operations, changes in emissivity of the product surface, such as with wire or the like. Contacting thermocouples and resistance thermometers create frictional heat between the moving material and the detection device and thus give a false temperature indication.

SUMMARY

According to the present invention, temperature measuring apparatus is provided which includes a high thermal conductivity reference body mounting a heat flow sensor to determine the heat flow between the reference body and an external body located adjacent the reference body. A temperature sensor provides a signal proportional to the temperature of the reference body. In addition, the apparatus includes means for establishing the spacing between the reference and external bodies so that the heat flow sensor output signal can be calibrated to yield the absolute temperature of the external body. In addition, the apparatus includes in one embodiment a specially configured reference body having a groove for receiving a moving fiber a predetermined distance from the base of the groove. A typical distance would be 0.015 to 0.020 inches. The heat flow sensor is carried in the base, thereby facilitating the aforementioned calibration of the heat flow sensor output signal.

As the external body moves past the heat flow sensitive surface of the reference body, heat will be exchanged by convection between external and reference bodies whenever they are not at the same temperature. This will cause heat to flow into or out of the sensing head surface of the reference body. The magnitude of the heat flow will be proportional to the temperature difference between the bodies, the spacing between the bodies and the thermal conductance of the heat flow path across the air spacing between them. By keeping the spacing constant, it is possible to calibrate the heat flow rate, measured by the heat flow sensor in the reference body, as a function of temperature difference between the reference and external bodies for a given reference body temperature. By adding this measured, calibrated temperature difference between the bodies to the reference body temperature measured by the temperature sensor in the reference body, the absolute temperature of a moving external body is obtained.

With this arrangement, the surface of the reference body at which the measurements are being made does not need to contact a moving external body to determine its temperature. Thus, generation of frictional heat is avoided, thereby avoiding false temperature indications. In addition, the surface of the reference body can be made reflective so that the transfer of heat is predominately by conduction and convection across the space between the bodies. Thus, effects of emissivity variation of the external body are eliminated. Furthermore, by placing the reference body sensing surface, past which the material moves, at the bottom of the groove in the reference body, as mentioned previously, the effects of the surrounding environment are minimized to the point of being insignificant to the operation of the present apparatus.

In summary, the calibrated temperature difference signal and the reference body temperature may be read separately, then added together to obtain the absolute temperature of the external body or, by electronically trimming, as by a shunt or variable gain amplifier, the temperature difference signal generated by the heat flow sensor, so that it has the same sensitivity in terms of volts or other signal units per degree temperature difference as the temperature sensor in the reference body, and connecting these signals so that they are electrically and algebraically additive, a voltage is obtained which is directly proportional to the external body temperature. This signal can then be applied to standard temperature recorders or meters to obtain the reference body temperature, or it can be applied to standard temperature controllers to allow automatically adjusting or controlling the external body temperature during processing.

An alternate method of control is to control the temperature of the reference body to the desired external body temperature. The heat flow sensor signal is then directly an error signal, which is zero only when the reference and external bodies are at the same temperature, and which can be applied directly to a controller alone or in combination with a signal from a temperature sensor located in the reference body. Reference is made to our U.S. Pat. No. 3,542,123 for further details respecting these methods, which are all applicable to the apparatus of the present invention.

Other objects and features of the invention will become apparent from consideration of the following description taken in connection with the accompanying drawings.

DESCRIPTION OF THE PREFERRED EMBODIMENT

Figure 1:
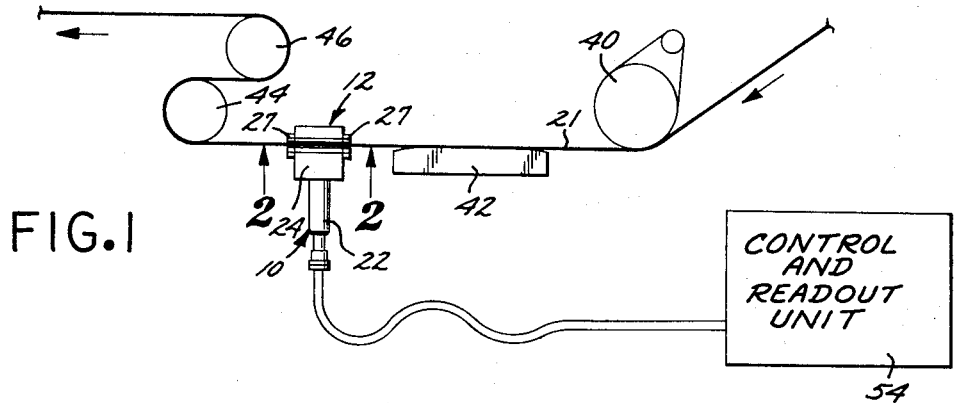
FIG. 1 is a diagrammatic view of an embodiment of the present temperature measuring apparatus which is particularly adapted for detecting the temperature of a moving fiber or thread line coming off textile thread equipment, only a portion of which is illustrated.

Referring now to the drawings, a temperature detection apparatus 10 is illustrated which comprises, generally, a thermally conductive reference body or sensor head 12; temperature change means for altering the temperature of the head 12, including an electrical resistance heating element or cartridge 14 and cooling coils 16; a heat flow sensor 18; and a temperature sensor 20.

As previously indicated, the apparatus 10 is adapted to detect the temperature of a surrounding medium or external body, whether it be a fluid, solid, or granular substance, in this case a wire or thread line 21, by placement of the sensor head 12 in proximity to the line 21 without actually physically contacting the line 21.

Thus, the sensor head 12 is a thermally conductive reference body made of material such as aluminum, copper or the like, and constitutes a thermal sink into and out of which heat flow can occur.

The sensor head 12 includes a generally cylindrical handle portion 22 which is integral with a larger diameter end or base 24 having a groove 23 whose bottom constitutes an active or operative face 26. The operative face 26 is located a predetermined distance from the line 21 whose temperature is to be measured, the line 21 being movable past the operative face 26, as will be more completely described hereinafter. As best seen in a comparison of FIGS. 2 and 3, the line 12 moves along a path in close proximity to the heat sensor 18 and to the operative face 26 of the sensor head 12, with the path of travel being substantially longer than the distance, or air gap, between the line 21 and the surface of sensor 18.

The distance between the line 21 and the bottom 25 is established by passing the line 21 across a pair of standard ceramic textile thread guides 27 suitably mounted to opposite sides of the base 24. The guides 27 form the only points of contact with the line 21 and generate negligible frictional heat. The location of the heat flow sensor 18 in the operative face 26 locates it in a protected position relative to the surrounding environment, and it is also remote from even the slight heat which is generated by the frictional engagement between the line 21 and the thread line guides 27.

The space or distance between the line 21 and the sensor 18 afforded by this arrangement is approximately 0.015 to 0.020 inches although, of course, this will vary with the particular application at hand.

The cartridge heater 14 may be any suitable heater for raising the temperature of the mass of the head 12, the cylindrical form shown being conveniently disposed within a vertically oriented bore provided in the base 24 of the head 12 in thermal exchange relation with the sides or walls of the bore. Any of various other means could also be used for raising the temperature of the head 12, such as fluid heating passages provided in the head.

The particular form of heat flow sensor utilized is not critical to the present invention, so long as it is capable of sensing the convective heat flow resulting from a temperature differential between the line 21 and the mass of the head 12. The sensor 18 illustrated is a thermoelectric device or thermopile adapted to generate a voltage proportional to the rate of heat flow. Reference is made to our U.S. Pat. No. 3,542,123 for details respecting the sensors 18 and 20.

The operative face 26 is provided with a thin thermally reflective coating 38, such as gold or aluminum, which is operative to reject any radiant heat flow component from the line 21 or elsewhere, without affecting the larger and more significant convective-conductive heat flow components.

As more particularly described in our U.S. Pat. No. 3,542,123, where the apparatus 10 is to be used as a controller to maintain the temperature of the external body at some predetermined set-point temperature, and where the usual temperature of the environment surrounding the head is always less than the set-point temperature, no cooling of the head 12 is required. However, where the apparatus 10 is to be used in an environment whose temperature is above the set-point temperature or the temperature of the line 21, the sensor head 12 must be cooled and the cooling coils 16 afford a means to accomplish temperature reduction. Such cooling can be accomplished in any suitable manner.

The temperature sensor 20 is disposed within and in thermal exchange relation with the walls of a vertically oriented bore provided in the head 12. The sensor 20 is preferably a conventional thermocouple whose junction is located relatively close to the operative face 26. The sensor 20 generates a voltage proportional to its temperature and could, if desired, also take the form of a resistance thermometer or other means suitable for the purpose described.

As best seen in FIG. 1, the thread line 21 is drawn over a heating roll 40, across a heated shoe 42, and past the operative face 26 by process take-up rolls 44 and 46. The rolls 40, 44, and 46 and the heated shoes 42 are commonly used in textile equipment and will not be described in detail since they form no part of the present invention other than that they form a convenient means for arranging the thread line 21 taut across the thread guides 27.

Figure 2:
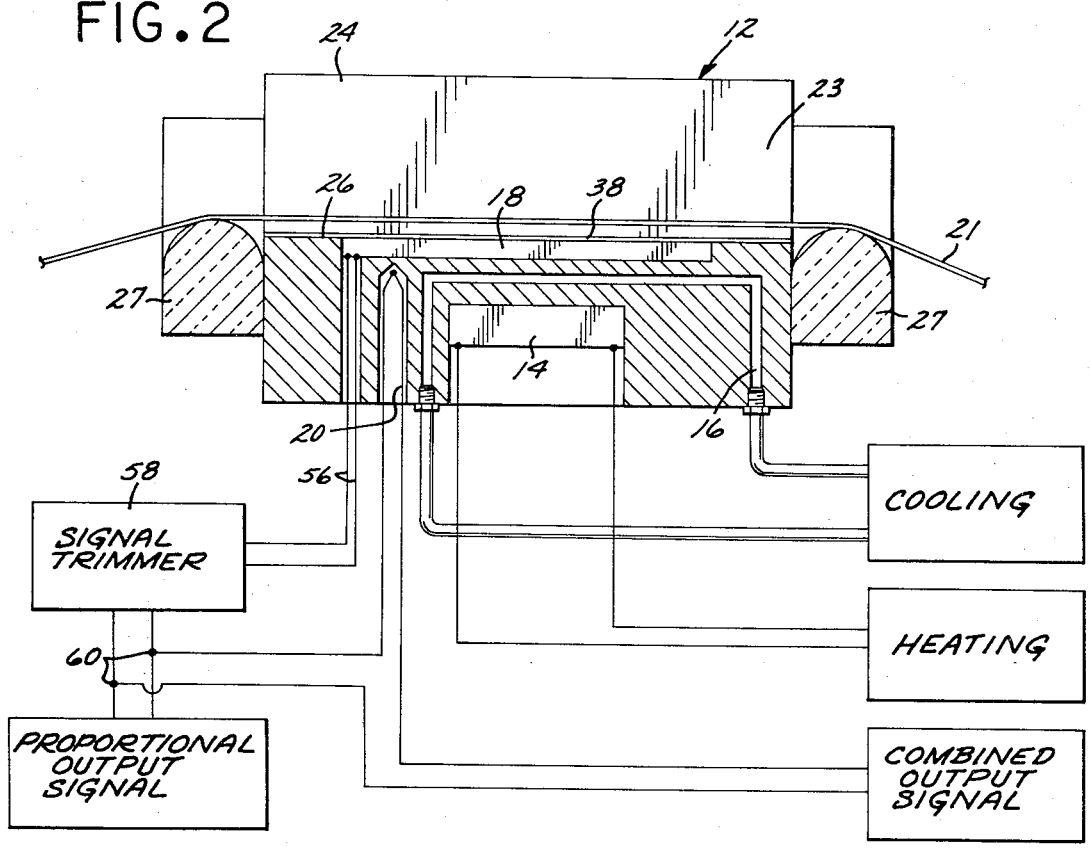
FIG. 2 is a partially diagrammatic view of the apparatus of FIG. 1, including an enlarged transverse cross-sectional view of the sensor head.
Figure 3:
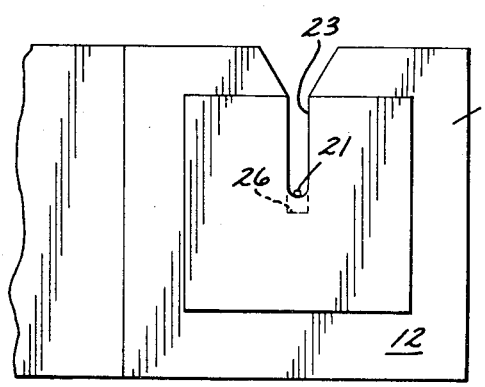
FIG. 3 is an end elevational view of the sensor head of FIG. 2.

With reference to FIG. 2, the output signal from the heat flow sensor 18 is applied through leads 56 to a signal trimming device 58, such as an electrical shunt or variable gain amplifier. The device 58, as will be apparent to those skilled in the art, is selected and operated such as to adjust the magnitude of the output signal from the heat flow sensor 18 to a convenient sensitivity in terms of volts per degree. This proportional temperature difference signal can be read on a meter or other readout or recording device or, as previously indicated, and by methods like those described in our U.S. Pat. No. 3,542,123, the signal can be applied to a suitable controller (not shown) to control the temperature of the thread line 21 by controlling the heating of the heated shoe 42, or the like. Also, the device 58 may be selected and operated such as to adjust the magnitude of the output signal from the heat flow sensor 18 to the same sensitivity in terms of volts or other signal units per degree temperature difference as the temperature sensor 20. These trimmed signals constitute an output signal proportional to the temperature difference between the thread line 21 and the sensor head 12 at the operative face 26. This trimmed output signal is then connected to the output signal of the temperature sensor 20 at junctions 60 so that the two signals are electrically and algebraically added. The voltage signal resulting is directly proportional to the temperature of the thread line 21. As will be apparent to those skilled in the art, this resulting voltage signal may be applied to any suitable calibrated readout (not shown) to display the absolute temperature of the thread line 21. Also, as previously indicated, and by methods like those described in our U.S. Pat. No. 3,542,123, the signal can be applied to a suitable controller (not shown) to control the temperature of the thread line 21 by controlling the heating of the heated shoe 42, or the like. Thus, the present invention comprehends either thread line temperature monitoring or control, as desired.

The term "signal" is intended to be broadly construed to cover or encompass sensors whose outputs are mechanical movements or "signals." For example, there are heat flow sensors characterized by a mechanical output or movement in response to differential expansion of a pair of bodies. Likewise, temperature sensors of the bimetallic thermometer type have an output which is a mechanical movement. As will be apparent, these mechanical movements of the sensor can also be mechanically linked in the same way as their electrical counterparts. Consequently, the present invention comprehends utilization of such mechanical sensor in place of, in addition to, or in combination with the sensors previously mentioned. The particular type of heat flow sensor or temperature sensor utilized in the various embodiments herein described need only be capable of providing an output directly proportional to heat flow, in the case of a heat sensor, or directly proportional to the temperature of the head or probe, in the case of the temperature sensor. Also, as will be apparent, the apparatus 10 can be used with a variety of process controllers.

It is particularly noted that by utilizing the method and apparatus of the present invention the temperature differences are at all times relatively small. That is, the temperature of the sensor head at the operative face 26 and the temperature of the thread line 21 are very close to being the same because of the near-null heat balance operation of the apparatus for the temperature of the mass of sensor head 12 is selected to be near that of the thread line 21, and is held at that value. The operative face 26, which carries the heat flow sensor 18, is thus held at a selected temperature near that of line 21, so that as the line passes through the sensor head, the air layer between face 26 and thread 12 takes on a temperature distribution which is dependent upon the temperatures of the sensor head and thread line only. The sensor head thus serves to isolate the measuring operation from the effects of the ambient temperature conditions, whereby the heat flow to be measured is a function of the relative temperatures of the sensor head 12 and the line 21. Consequently, any errors which may occur in the heat flow measurement desirably have a minimum effect on the total absolute measurement of temperature.

Calibration of the signal from the heat flow sensor 18, as previously described, can best be accomplished when the variables which affect the signal, such as for example the emissivity of the operative face 26, and the spacing between the thread line 21 and the sensor head 12, are kept relatively constant. In this regard, the thread guides 27 are utilized for accurate spacing in the present embodiment, but rotating sheaves or other systems could be utilized instead if desired. Emissivity variations in the thread line 21 do not affect the accuracy of the apparatus 10 since the reflective coating 38 on the operative face 26 renders the apparatus 10 insensitive to heat radiation.

The foregoing description is primarily directed to the measurement or control of the temperature of a thread line 21, such as would be necessary in assuring constant drawing or working temperatures, but the apparatus 10 is equally applicable to other applications in which the important variables which affect the heat flow can be kept relatively constant, thereby enabling the signal to be calibrated to reflect the variation due to changes in temperature of the external body being measured or controlled.

Various modifications and changes may be made with regard to the foregoing detailed description without departing from the spirit of the invention.

We claim:

1. Temperature measuring apparatus comprising:

a thermally conductive reference body having an operative face adapted for association in conductive-convective heat exchange relation with a moving external body;

a heat flow sensor mounted to said reference body in said operative face and reactive to heat flow adjacent said face to generate an output signal proportional to the temperature difference between said reference body and the external body;

means for producing an air layer adjacent said heat flow sensor having a temperature distribution dependent upon the temperatures of said heat flow sensor and said moving external body only;

spacing means locating and maintaining said heat flow sensor in constant distance, closely spaced relation to said external body whereby said heat flow sensor is subjected to substantially more conductive-convective heat transfer than radiant heat transfer;

a temperature sensor mounted to said reference body in thermal exchange relation and adapted to generate an output signal proportional to the temperature of said reference body; and means for calibrating said output signal of said heat flow sensor to provide an output signal representing temperature difference between said reference body and said external body.

2. Temperature measuring apparatus according to claim 1 and including temperature change means operative to maintain the temperature of said reference body at a predetermined temperature.

3. Temperature measuring apparatus according to claim 1 and including a radiant heat reflective coating over said operative face and said heat flow sensor whereby said heat flow sensor is not reactive to radiant heat flow.

4. Temperature measuring apparatus according to claim 1 wherein said spacing means comprise a pair of guide means for spacing said moving body a constant distance from said operative face, whereby said external body moves in a path generally parallel to the surface of said operative face for a distance which is substantially greater than the distance between said moving body and said operative face, said heat flow sensor in said operative face thereby being subjected to heat flow resulting essentially only from any temperature difference existing between said operative face and said moving body.

5. Temperature measuring apparatus according to claim 1 and wherein said operative face comprises a groove in said reference body; and said external body in an elongated moving element passing through said groove.

6. Temperature measuring apparatus according to claim 1 wherein said heat flow sensor is a thermopile.

7. Temperature measuring apparatus according to claim 1 and wherein the output signal of said heat sensor is calibrated to the output signal of said temperature sensor, and said output signal of said heat flow sensor is coupled to said output signal of said temperature sensor whereby the resulting signal is proportional to the absolute temperature of said external body.

8. Temperature measuring apparatus according to Claim 1 wherein said temperature sensor is a thermocouple.

9. A method of measuring the temperature of a moving body comprising the steps of:

passing said moving body at a constant distance over a reference body of known temperature whereby their proximate surfaces are out of engagement, but spaced sufficiently close whereby substantially all of any heat transfer therebetween is conductive-convective heat transfer and only a minor portion is radiant heat transfer;

producing in the air layer between said moving body and said reference body a temperature distribution dependent upon the temperatures of said sensor and said moving body only;

measuring the rate of convective and conductive heat flow between said moving body and said reference body; and calibrating the measured rate of said heat flow in terms of temperature difference whereby said measured rate is directly proportional to the temperature difference between said moving body and said reference body.

10. A method according to claim 9 and including the step of measuring the temperature of said reference body and algebraically adding a signal corresponding to said temperature and a signal corresponding to said temperature difference, after calibrating said signals in terms of corresponding sensitivity, whereby a resulting signal is obtained which is proportional to the temperature of said moving body.

11. A method according to claim 9 and including the step of rendering said reference body reflective to radiant heat whereby emissivity of said moving body does not significantly affect the measured rate of heat flow between said moving body and said reference body.

12. A method according to claim 9 wherein said moving body is an elongated fiber-like element and including the step of passing said element through a groove in said reference body and measuring said rate of heat flow in said groove to thereby reduce extraneous environmental affects.

13. Temperature measuring apparatus comprising:

a thermally conductive reference body having an operative face adapted for association in conductive-convective heat exchange relation with an elongated moving element;

spacing means for locating and maintaining said operative face and said moving element in spaced relation whereby their proximate surfaces are out of engagement, but spaced sufficiently close whereby any heat transfer therebetween is substantially all attributable to conductive-convective heat transfer and only a minor portion if any is attributable to radiant heat transfer;

a heat flow sensor mounted to said reference body in said operative face;

means for producing between said operative face and said moving element an air layer having a temperature distribution which is dependent upon the temperatures of said operative face and said moving element only, said heat flow sensor being reactive to the conductive-convective heat transfer due to said temperature distribution to generate an output signal proportional to the temperature difference between said reference body and said moving element;

a temperature sensor mounted to said reference body in heat exchange relation and adapted to generate an output signal proportional to the temperature of said reference body; and means for calibrating said output signal of said heat flow sensor to provide an output signal representing the temperature difference between said reference body and said moving element.

14. Temperature measuring apparatus according to claim 13 and wherein the output signal of said heat sensor is calibrated to the output signal of said temperature sensor, and said output signal of said heat flow sensor is coupled to said output signal of said temperature sensor whereby the resulting signal is proportional to the absolute temperature of said moving element.

* * * * *